T. HENDERSON.
CUTTER-BARS FOR REAPERS AND MOWERS.

No. 172,736. Patented Jan. 25, 1876.

WITNESSES:
W. W. Hollingsworth
John C. Kenno

INVENTOR:
Thomas Henderson
BY
ATTORNEYS.

UNITED STATES PATENT OFFICE.

THOMAS HENDERSON, OF BLACK HORSE, ASSIGNOR TO HIMSELF AND THOMAS AND WILLIAM B. HILL, OF BALTIMORE, MARYLAND.

IMPROVEMENT IN CUTTER-BARS FOR REAPERS AND MOWERS.

Specification forming part of Letters Patent No. 172,736, dated January 25, 1876; application filed October 23, 1875.

*To all whom it may concern:*

Be it known that I, THOMAS HENDERSON, of Black Horse, in the county of Harford and State of Maryland, have invented a new and Improved Cutter-Bar for Reapers and Mowers; and I do hereby declare that the following is a full, clear, and exact description of the same, reference being had to the accompanying drawing, forming a part of this specification, in which—

Figure 1:
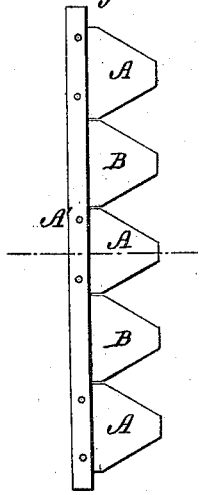
Figure 2:
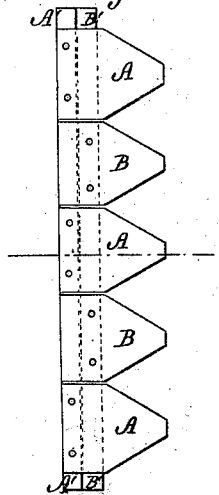
Figures 3, 5:
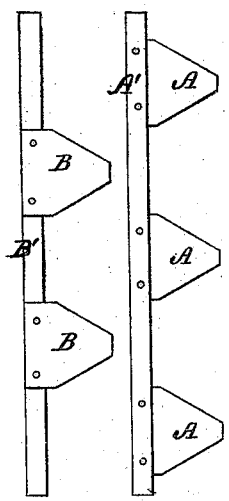
Figures 4, 6:
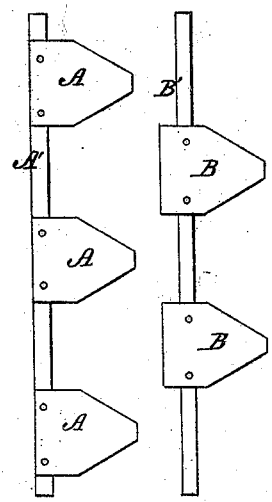

Figures 1 and 2 are plan views of the two forms of the cutter-bar. Figs. 3 and 4 are transverse sections of the same. Figs. 5 and 6 are plan views of the two forms with the parts detached.

The object of this invention is to provide an improved means of attaching the knives of a reaper or mower to the reciprocating bar, whereby the said knives may be more conveniently and safely handled and more readily sharpened.

It consists in attaching each alternate knife to a separate bar, and then placing and fastening the two bars together, so as to form a continuous saw-shaped or serrated cutting-edge.

In the drawing, X represents my improved cutter-bar, in which the knives A A A are attached to one bar, A', and the intermediate knives B B B are attached to the other bar, B', the bars being fitted and fastened together, and their respective sets of knives fitting reciprocally between each other, so as to form a continuous saw-shaped cutting-edge.

As ordinarily constructed a single bar is used, to which the knives are fastened permanently contiguous to each other, so that, when the teeth become dull and the knives are to be sharpened upon the grindstone, certain portions of the acute angles between the knives are inaccessible, and either have to be sharpened by a file or left dull.

Moreover, in handling the old form of cutter-bar during the process of sharpening, the entire weight of the same has to be lifted and applied to the grindstone, while the close arrangement of the knives renders the hold upon the same insecure, and liable to result in injury to the hand of the operator.

By means of my improved arrangement of the alternating knives upon separate bars it will be seen that each bar carrying one-half of the knives may be handled and sharpened at a time, and the facilities for sharpening rendered far greater, for the reasons that but one-half of the weight need be lifted at a time, every portion of the knife is accessible to the cutting action of the grindstone, and the interval or space between the knives of the same bar affords a hold to the hand, whereby the operator may safely handle the same.

In arranging my knives according to my invention I do not confine myself to any particular way of adjusting the two bars with respect to each other, and I may place them one upon the other, so as to encompass the knives, as in Figs. 1, 3, 5; or I may place one bar behind the other, so as to leave the knives all on one side, as shown in Figs. 2, 4, 6.

Having thus described my invention, what I claim as new is—

A reciprocating cutter-bar for mowers and reapers, consisting of two independent detachable bars, to which the alternating knives are respectively attached, as and for the purpose described.

THOMAS HENDERSON.

Witnesses:
   CHAS. A. PETTIT,
   SOLON C. KEMON.